(12) United States Patent
Danielsson et al.

(10) Patent No.: US 8,543,263 B2
(45) Date of Patent: Sep. 24, 2013

(54) DISTRIBUTED AVIONICS

(75) Inventors: Torkel Danielsson, Linköping (SE); Anders Pettersson, Linköping (SE); Jan Håkegård, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 13/704,890

(22) PCT Filed: Jun. 17, 2010

(86) PCT No.: PCT/SE2010/050683
§ 371 (c)(1),
(2), (4) Date: Feb. 14, 2013

(87) PCT Pub. No.: WO2011/159209
PCT Pub. Date: Dec. 22, 2011

(65) Prior Publication Data
US 2013/0138271 A1    May 30, 2013

(51) Int. Cl.
*G01C 23/00* (2006.01)
(52) U.S. Cl.
USPC ............................................................... 701/3
(58) Field of Classification Search
None
See application file for complete search history.

(56) References Cited

U.S. PATENT DOCUMENTS

| 6,886,024 B1 | 4/2005 | Fujita et al. | |
|---|---|---|---|
| 6,965,816 B2 * | 11/2005 | Walker | 701/16 |
| 2003/0093187 A1 * | 5/2003 | Walker | 701/1 |
| 2005/0187677 A1 * | 8/2005 | Walker | 701/16 |
| 2007/0061807 A1 | 3/2007 | Bibby | |
| 2008/0215927 A1 | 9/2008 | Roussel | |
| 2010/0100887 A1 | 4/2010 | Beltrand | |

FOREIGN PATENT DOCUMENTS

WO    WO-01/86442 A2    11/2001

OTHER PUBLICATIONS

PCT/ISA/210—International Search Report—Feb. 17, 2011 (Issued in PCT/SE2010/050683).
PCT/ISA/237—Written Opinon of the International Searching Authority—Feb. 17, 2011 (Issued in PCT/SE2010/050683).
PCT/IPEA/409—International Preliminary Report on Patentability—Jun. 13, 2012 (Issued in PCT/SE2010/050683).

* cited by examiner

*Primary Examiner* — Thomas Tarcza
*Assistant Examiner* — Adam Alharbi
(74) *Attorney, Agent, or Firm* — Venable LLP; Eric J. Franklin

(57) ABSTRACT

A distributed avionics system arranged in an aerial vehicle for controlling at least one avionics function. A plurality of avionics processing subsystems are interconnected in a network. Each avionics processing subsystem includes a processor arranged to process at least one task so as to provide a set of data messages including at least one unit of data related to controlling the at least one avionics function on basis of provided input data, related to conditions of the at least one avionics function. A memory module is in operative connection with the processor and is arranged to store instructions for the processor to process the at least one task. At least one of the avionics processing subsystems is arranged to transmit at least one synchronization cycle start signal onto the network.

9 Claims, 7 Drawing Sheets

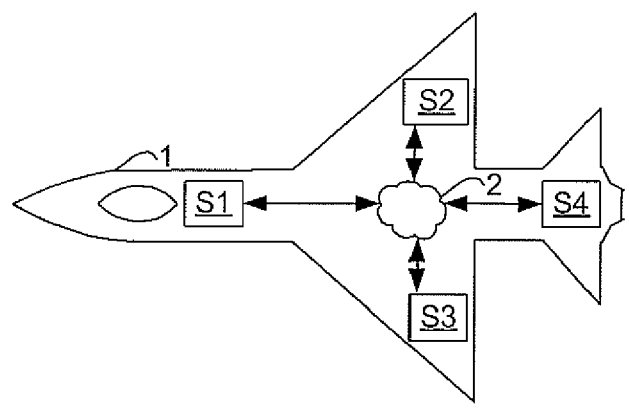
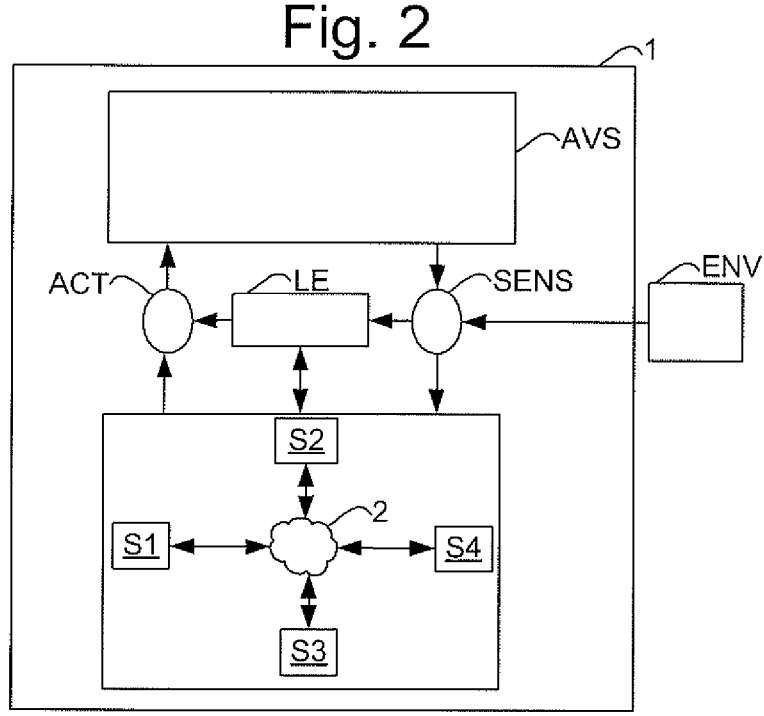

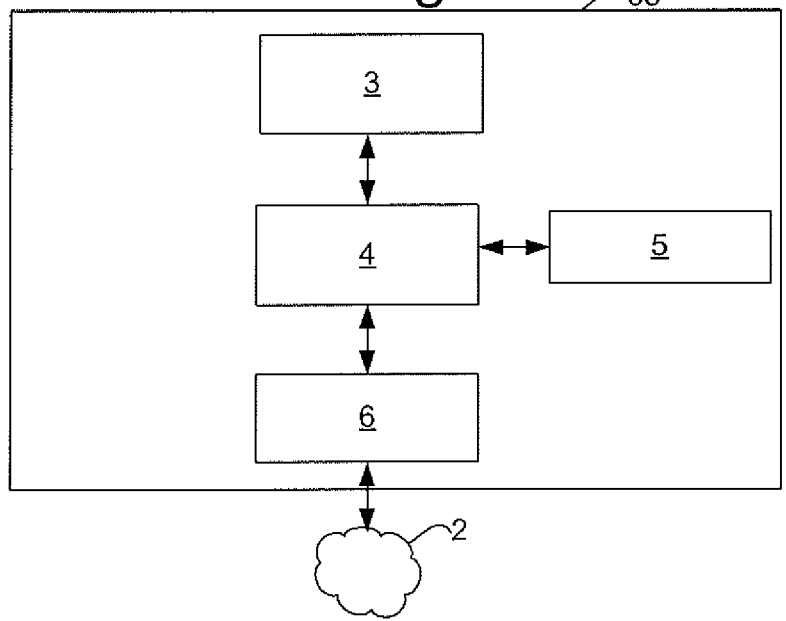
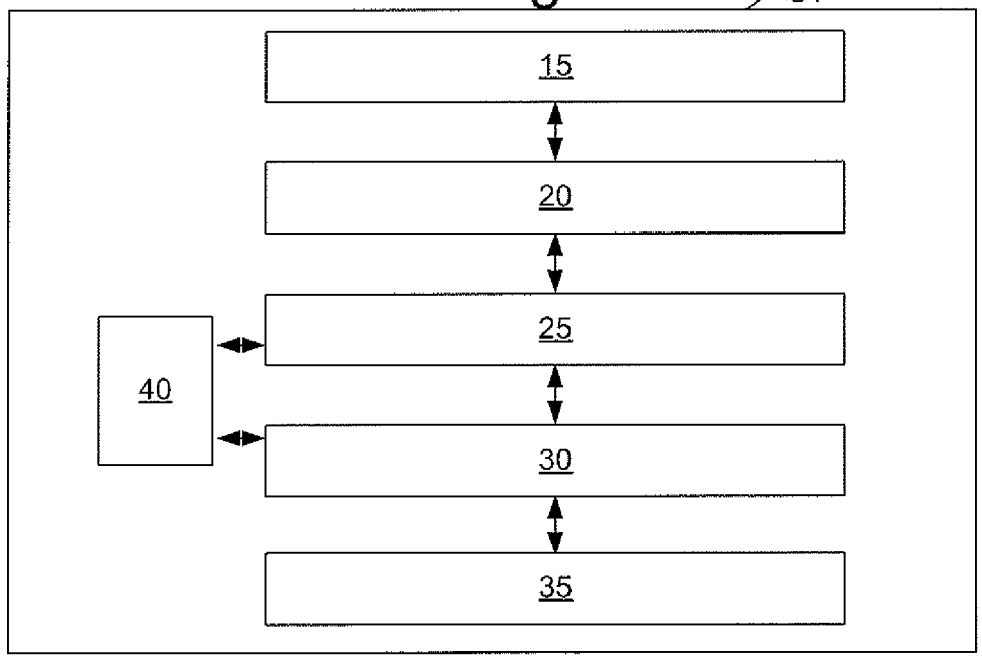

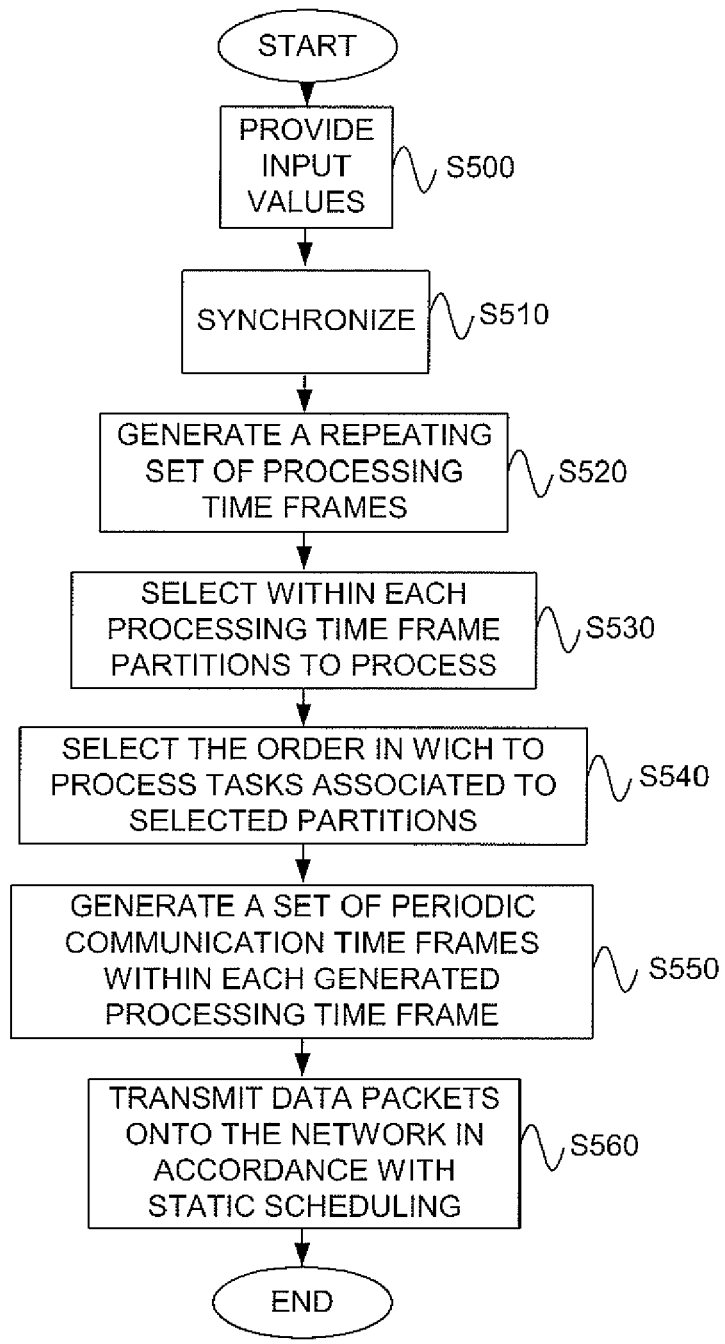

DISTRIBUTED AVIONICS

CROSS-REFERENCE TO RELATED APPLICATIONS

This application is the national phase under 35 U.S.C. §371 of PCT/SE2010/050683 filed 17 Jun. 2010.

TECHNICAL FIELD

The present invention relates to a system and a method for control of avionics.

Furthermore, the invention relates to software adapted to perform steps of the control method when executed on a computer.

BACKGROUND OF THE INVENTION

In embedded control systems of today, developments in digital technology have enabled complex functionality. However as a direct result from the development, the need of additional system capacity provided by software and various components such as sensors, processors, display units, data buses and memory units is increasing.

Apart from implementing more functionality and interconnectivity in control systems, using less Space Weight and Power (SWaP) and a reduced number of cabling are further important drivers. Updates of embedded hardware and software during a products life span make adaptability and modularity another interesting design parameter. Other incentives include achieving cost efficient development, production and maintenance, where one possible route is to implement Commercial of the Shelf (COTS) technology instead of expensive specialized technology.

Real-time systems for safety critical control applications, wherein typically data from sensor/s are acquired, communicated and processed to provide a control signal to an actuator pose strict demands regarding bandwidth, data delivery time, redundancy, and integrity. Failure to meet one or several of these demands can in applications including "brake-by-wire" or "steer-by-wire" prove dangerous.

One such area wherein reliable high-speed real-time execution and communication of data is applicable is within avionics systems. Advances in technology during late 1960 and early 1970 made it necessary to share information between different avionics subsystems in order to reduce the number of functional modules such as Line Replaceable Units (LRU:s). A single sensor such as a position sensor provided information to weapon systems, display system, autopilot and navigation system.

The high level architecture of avionics systems has gone from federated meaning separate LRU:s for separate functions to integrated modular avionics (IMA) meaning several functions integrated into multifunctional LRU:s. The connectivity allowing communication between different LRU:s has gone from low bandwidth point-to-point connections to higher bandwidth bus connections.

Guidance set out by Radio Technical Commission for Aeronautics (RTCA) in DO-178B and RTCA DO-254 regulates how to design and develop software and respective hardware in a safe way in order to show airworthiness, according to a criticality scale. However certification and subsequent recertification of software according to the DO-178B represents a substantial cost of developing software based avionic control systems.

In order to assist development of modern control systems for avionics a set of guidance documents such as DO-297 and Aeronautical Radio Inc. (ARINC) 651 defines general concepts for IMA systems. Further ARINC 653 "Avionics application software standard interface", defines an Application Program Interface API referred to as Application Executive (APEX), implemented in Real-Time Operating Systems (RTOS) used for avionic control systems. APEX allows for space and time partitioning that may be used wherever multiple applications need to share a single processor and memory resource, in order to guarantee that one application cannot bring down another in the event of application failure.

Document U.S. Pat. No. 6,886,024 B1 discloses a system in which execution of plural applications distributed over plural computers is controlled using a simplified script language to realize coordination among plural applications to enable facilitated construction of upper-order distributed applications. Each computer includes, on an agent platform, an agent base capable of having a shell agent, a local service agent and an application agent, an agent movement unit, thread generating unit, remote control unit and agent generating unit. A script language input through an input unit is interpreted by the shell agent to boot the application agent. The application agent supervises an actual application. The shell agent and the application agent can be moved to another computer using the agent movement unit and can have communication with an agent in the other computer with the aid of the remote control unit.

Document WO/2001/086442 A2 discloses techniques for inter-application communication and handling of I/O devices in an Integrated Modular Avionics (IMA) system enable the integration of multiple applications while maintaining strong spatial and temporal partitioning between application software modules or partitioned applications. The integration of application modules is simplified by abstracting the desired application interactions in a manner similar to device access. Such abstraction facilitates the integration of previously developed applications as well as new applications.

However, moving from specialized avionic systems using dedicated hardware and software in attempts to achieve increased system performance, modularity and cost efficiency tends to produce complex systems with decreased determinism.

Accordingly, there is a need in the art of avionics to present an improved avionics system, intended to enhance dependability and determinism.

OBJECTIVE OF THE INVENTION

It is therefore an objective of the present invention to provide a system and a method which achieve increased dependability and determinism in regard of data traffic and processing.

SUMMARY OF THE INVENTION

This object is achieved according to the present invention by a distributed avionics system arranged in an aerial vehicle for controlling at least one avionics function, the system comprising: a plurality of avionics processing subsystems interconnected in a network. Each avionics processing subsystems comprising: processing means, arranged to process at least one task so as to provide a set of data messages comprising one or more units of data related to controlling the at least one avionics function on basis of provided input data, related to conditions of the at least one avionics function, memory means, in operative connection with the processing means arranged to store instructions for the processing means to process said at least one task. At least one of the avionics processing subsystems is arranged to transmit at least one synchronization cycle start signal onto the network. Each avionics processing subsystems is arranged to generate a repeating set of periodic processing time frames by detecting repeatedly subsequent instants of time, based on a first predetermined interval and the at least one cycle start signal. Each avionics processing subsystems is arranged to select within each of the generated processing time frames at least one task set to process, based on a predetermined schedule. Each avionics processing subsystems is arranged to select the order in which to process each of at least one task within each of the selected at least one task set, based on a predetermined processing rate associated to each of the at least one task, determined from a set of system global processing rates in descending order of said associated processing rate.

By this is achieved a deterministic, robust and cost efficient real-time distributed processing system with a high system safety and low amounts of jitter on measurable system availability parameters.

The system is in one option further characterized in that at least one of the tasks within at least one task set allocated to at least one of the avionics processing subsystems of the plurality of avionics processing subsystems is arranged to be dependent on at least one of one or more units of data provided by at least one previously processed task allocated to a different avionics processing subsystems of the plurality of avionics processing subsystems in order to provide one or more units of data related to controlling the at least one avionics function.

The system is in one option further characterized in that each of the processing subsystems is arranged to generate a set of periodic communication time frames by detecting repeatedly subsequent instants of time within each generated processing time frame, based on a second predetermined periodic time interval.

The system is in one option further characterized in that each of the processing subsystems comprise a network interface and transmission control unit arranged to control the network interface to perform scheduled transmissions of data packets, wherein said transmission control unit is provided with access to memory means comprising scheduling information relating to a timing table statically allocating to said plurality of communication time frames a predetermined number of data packets, each comprising a predetermined subset of data messages from said set of data messages.

The system is in one option further characterized in that the scheduling information is based on determined end-to-end communication delay constraints associated to communication of the data messages between processes allocated to different system nodes.

The system is in one option further characterized in that the scheduling information is configured so as to prevent communication time frame over-run wherein at least one of the data packets is transported on the network for a plurality of consecutive communication time frames.

The system is in one option further characterized in that each of the avionics processing subsystems is arranged to select within each of the generated processing time frames at least one task set to process, based on a predetermined sequence of task sets, further comprises to select within each of the generated processing time frames at least one task set to process for a predetermined time frame each in a predetermined memory address space each.

This objective is also achieved according to the present invention by a method for operating a distributed avionics computing system for controlling at least one avionics function the method comprising the steps of: providing input data, related to conditions of the at least one avionics function, providing the input data to the memory unit of the processing subsystems for later processing by at least one task in order to provide a set data message comprising one or more units of data related to controlling the at least one avionics function, synchronize the avionics processing subsystems in time by generating at least one cycle start signal onto the network, generate a repeating set of periodic processing time frames by detecting repeatedly subsequent instants of time, based on a first predetermined interval and the at least one cycle start signal, select within each of the generated processing time frames at least one task set to process, based on a predetermined schedule, select the order in which to process each of at least one task within each of the selected at least one task set, based on a predetermined processing rate associated to each of the at least one task, determined from a set of system global processing rates in descending order of said associated processing rate.

This objective is also achieved by a computer programme comprising a programme code for performing the above described method steps, when said computer programme is run on a computer.

This objective is also achieved by a computer programme product comprising a program code stored on a computer readable media for performing the above described method steps, when said computer programme is run on the computer.

This objective is also achieved by a computer programme product directly storable in an internal memory of a computer, comprising a computer programme for performing the above described method steps, when said computer programme is run on the computer.

BRIEF DESCRIPTION OF THE DRAWINGS

FIG. 1. shows schematically a distributed avionics system in accordance with an example of the invention.

FIG. 2. shows schematically the distributed avionics system integrated to components of an aerial vehicle in accordance with an example of the invention.

FIG. 3. shows a schematic block diagram of hardware components of the distributed avionics system in accordance with an example of the invention.

FIG. 4. illustrates a schematic representation of the hardware components and software in accordance with an example of the invention.

FIG. 10. shows a schematic flow chart over a method for operating the distributed avionics system according to one example of the invention

DETAILED DESCRIPTION

Figure 5:
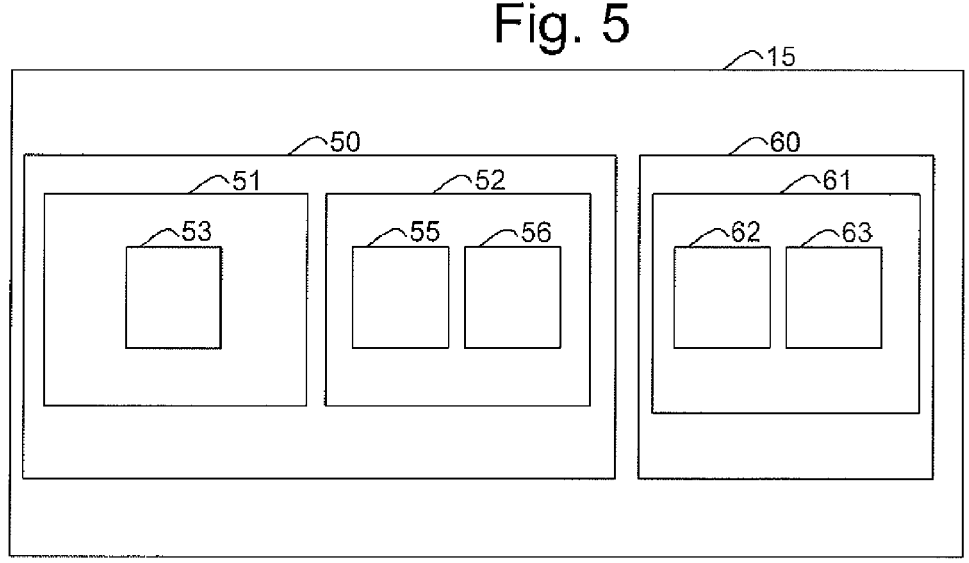
FIG. 5. illustrates a schematic representation of a portion of the software architecture in more detail.

Referring to the drawings, and initially to FIG. 1, there is illustrated a distributed avionics computing system in accordance with an example of the present invention. The distributed avionics computer system may comprise a plurality of avionics computers S1-S4 interconnected in a network 2, arranged to be mounted in various locations of an aerial vehicle 1 and act as controller of one or more of a set of subsystems of the aerial vehicle 1, such as for example act as a controller of a fuel injection system or hydraulics of an aileron.

In FIG. 2 there is illustrated an alternative view of the distributed avionics computer system to be configured, viewed as integrated systems/components of the aerial vehicle 1. The set of subsystems of the aerial vehicle AVS may comprise systems such as for example ailerons, flaps, fuel injection and payload. The distributed avionics computer system may comprise at least one computer node S1-S4, such as a general purpose computer arranged as a flight control computer (FCC) and/or a mission control computer (MCC), arranged to be in communicative connection with various of the set of subsystems of the aerial vehicle AVS and additional systems and/or components such as sensors SENS, actuators ACT and one or more control stations. The sensors SENS may provide information related to properties associated to one or more of the set of subsystems of the aerial vehicle AVS and of an operating environment ENV surrounding the aerial vehicle 1. The one or more control stations may provide information related to interactions from one or more operators of the aerial vehicle 1. The distributed avionics computing system may be arranged to process the information provided from one or more of the sensors SENS and/or control stations, in order to provide control data to the one or more actuators ACT and/or presentation data to the control stations. The distributed avionics computer system may be coupled to at least one legacy avionics processing component LE, such as for example a legacy LRU arranged as a radar processing unit, arranged to be in communicative connection with the various avionics subsystems AVS and additional systems and/or components such as sensors SENS, actuators ACT and the one or more control stations.

With reference to FIG. 3 the hardware configuration 35 of one of the plurality of computers S1 is illustrated in accordance with an example of the invention. Each of the plurality of computers S1-S4, hereinafter also referred to as nodes S1-S4, may comprise at least a processor 4, memory 3, hardware clock (not shown), power supply (not shown), bus interface 6 and I/O interface 5. The I/O interface 5 may be arranged to provide access to system peripherals e.g. devices coupled to the respective node by means of VME, PCIe, IDE or the like. The distributed avionics computer system may further comprise at least one network 2, such as for example an Ethernet network, operatively connecting the nodes S1-S4, thereby enabling exchange of data messages between the nodes. The communication network 2 is configured to provide means for communication of data packets comprising units of data arranged in data messages between the system nodes S1-S4. The data messages may each comprise one or more units of data also referred to as variables, related to for example, a sensor reading, a periodically calculated output value of a control loop or the like. Access to the network may be provided by the respective bus interface 6 which may be arranged to place data messages to and/or retrieve data messages from the network 2 in accordance with predetermined instructions stored on one or more portions of the memory 3. The bus interface 6 may further be arranged to provide access by means of one or more additional connections to other devices such as for example remote data concentrators (RDC:s), sensors and/or actuators. The one or more connections to the other devices may be point-to-point connections such as RS-422 or of bus type such as MIL-STD-1553, IEEE 1394, or other similar type of connection known within the art.

In FIG. 4 the configuration relating to the high level architecture of one of each of the plurality of computers S1 is illustrated in accordance with an example of the invention. Each node S1-S4 may apart from the above described hardware 35 with reference to FIG. 2 comprise a hardware interface system 30, arranged to by means of a set of interface drivers to provide access to specific hardware such as the memory 3 and the hardware clock. Each node S1-S4 may further comprise an operating system 25 such as a real-time operating system (RTOS). The operating system may be arranged to provide a number of services to a set of applications. The number of services may relate to communication, scheduling, memory management, timing and health monitoring, such as providing local system time and timer services. In providing the services the operating system may be arranged to interact with the hardware 35 by means of the hardware interface system 30. Each node S1-S4 may further comprise a configuration data module (CDM) 40. The CDM 40 may be arranged in operative connection with the operating system 25 and the hardware interface system 30 to provide information relating to specific configuration of memory access, scheduling and communication. As an example the CDM may be arranged to may be arranged to provide the RTOS with initialization parameters associated to execution timing of the set of applications. The CDM may be implemented in a separate memory component or in a memory region associated to the memory 3 associated to each of the nodes S1-S4.

Each application of the set of applications may comprise one or more tasks, also referred to as processes. Each of the one or more tasks may denote a logical unit of computation with a single thread of control. As an example an application may be arranged to process sensor readings and control commands provided by an operator by means of one or more control laws, to continuously provide a control signal to an actuator, such as for example provide a control signal to an actuator associated to an aileron. As a further example one of the tasks may be configured to perform a derivative operation on a parameter retrieved from a sensor, such as for example configured to perform a derivative computation of one or more subsequent parameters relating to an acceleration of an object in order to compute the velocity of the object.

In one example each node S1-S4 may be arranged to execute a partitioned real-time operative system RTOS, compliant with ARINC 653, to allow for spatial and temporal partitioning of the set of applications comprised in an integrated modular avionics IMA partitioning module 15. With reference to FIG. 5 the IMA partitioning module 15 may comprise one or more partitioned applications such as for example a first application 51, a second application 52 and a third application 61. Each of the applications may be divided in the IMA partitioning module 15 into one or more partitions such as for example a first partition 50 associated to the first application 51 and the second application 52 and a second partition 60 associated to the third application 61. Each of the applications 51-52 and 61 may further comprise one or more tasks. As an example a first task 53 may be associated to the first application 51, a second task 55 and a third task 56 may be associated to the second application 52 and a fourth task 62 and fifth task 63 may be associated to the third application 61. The one or more node S1-S4 may further each comprise an abstraction layer provided by an application programming interface (API) 20 located between application software in the IMA partitioning module and operative system OS. The API 20 may be arranged to provide a set of basic services to the set of applications required for performing their respective tasks and in order to communicate.

In one the example the API may be arranged as an application executive (APEX), conforming to the ARINC 653 specifications. The implementation of the ARINC 653 specifications, in regard of the high level IMA architecture prevents error propagation when running different applications on a single processor. The partitioning enables to run applications certified to different criticality level measured by design assurance level DAL according to the RTCA DO-178B on a single processor.

Figure 6:
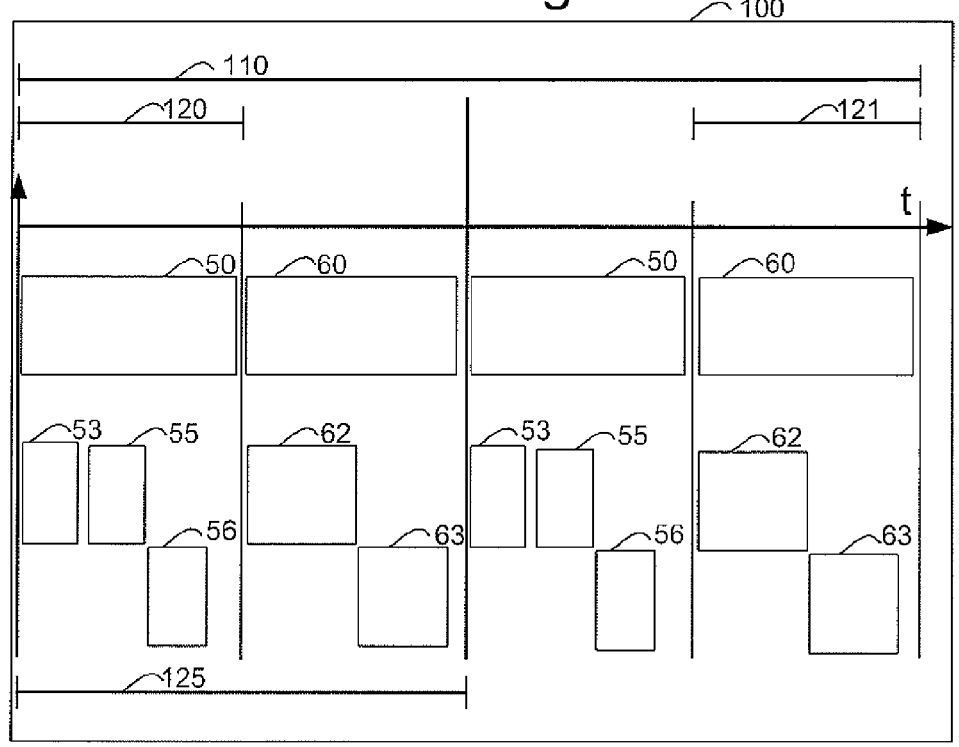
FIG. 6. shows a schematic illustration of a data execution schedule in accordance with an example of the invention.

In FIG. 6 the execution schedule 100 of partitions associated to one of the nodes is illustrated in accordance with an example of the invention. The processing resources of the processor 4 in each of the nodes S1-S4 may be divided by means of configuration into a set of minor execution time frames 125 also referred to as minor processing time frames. Each of the minor execution time frames 125 may be arranged to be periodical i.e. reoccurring periodically at a later time instants as defined by a period time. Each of the one or more partition allocated to the IMA partitioning module 15 in each of the respective nodes may be provided with at least one execution time frame, such as for example a first execution time frame 120 associated to the first partition 50, providing the partition with exclusive access to the processing resources 4 of the respective allocated node S1 for the given at least one execution time frame 120. One or several minor execution time frames may comprise one or more execution time frames associated to the partitions, such as for example a first execution time frame 120 associated to the first partition 50 and a second execution time frame 121 associated to the second partition 60. A major execution time frame 110 may determine the intrinsic repeat cycle of the schedule defined by one or several minor execution time frames 125 in each of the nodes S1-S4.

In one example each partition associated to the specific respective node may be assigned a predetermined order of a predetermined processing sequence, determining the order in which to process the partitions within each minor processing frame 125.

In one example each of the partitions of each IMA module may be allocated with zero or more predetermined execution time frames within each minor processing frame.

As an example the first partition 50 may be assigned with the first execution time frame 120 corresponding to a first portion being first in order within the minor processing time frame 125 and the second partition 60 may be assigned with the second execution time frame 121 corresponding to a second portion being second in order within the minor processing time frame 125.

The resulting sequence of processing is then according to the example to first process the first partition 50 for a time interval determined from the first execution time frame 120 and then switch to process the second partition 60 for a time interval determined from the second execution time frame 121. After completion of the minor processing time frame 125 the sequence may be periodically repeated.

In one example a plurality of differently configured minor processing time frame may be provided in each of the system nodes S1-S4. Hence each of the plurality of minor processing time frames may comprise different configurations regarding the number of specific partitions being allocated an execution time frame within the respective minor processing time frame. The length of the execution tune frame associated with the respective partition may vary among different minor processing time frames.

The execution schedule 100 may be utilized by the operating system 25 to determine when to perform context switches between different partitions and the tasks associated to the different partitions by means of clock interrupts provided from the hardware 35. For example the execution schedule 100 may determine when to perform context switches between the first partition 50 and second partition 60 and the respective associated tasks 53, 55-56, 62-63.

It should be understood that the configuration regarding the number of applications, tasks partitions and thereby also the execution frames may differ from the illustrated example with reference to FIG. 6.

Determination of the execution schedule 100 for each of the nodes S1-S4 may be performed by means of considering the computational requirements of the applications and their associated one or more tasks in respect of the resources provided by the nodes S1-S4.

During the execution time frame for the specific partition of the one or more partitions, the tasks associated to the specific partition may in one example be executed on a priority basis. Each task may be assigned a task frequency, relating to the subsequent executions of instances of the task.

In one example each of the tasks of the distributed avionics computing system may be arranged to execute periodically. In order to execute periodically the release time, referring to when a task may start to execute, may be time-triggered at a regular i.e. at a cyclic basis, such as time triggered by means of the timer services provided by the operating system. Each task may then be defined by a set of properties associated to timing, including a period time T defining the time interval between successive releases of the task, a completion time (CT) defining the time when the task completes its execution, a deadline (D) defining the latest time when the task should complete its execution and a worst case execution time (WCET) defining the time needed to execute the task without interruption. To determine the WCET for each specific task a series of measurements or static timing analysis may be performed. By assigning each task with design parameters relating to the deadline D and period T of the task, conformant to the conditions below, a feasible periodic task schedule may be achieved.

$$CT \leq WCET < D < T$$

$$U = \sum_{i=1}^{n} \frac{WCET_i}{T_i} \leq 1$$

Wherein U denotes the processor utilization parameter of the processor assigned to execute set of task as indicated by index i, wherein n denotes the total number of tasks assigned to the processor resource. As an example a computed value regarding U that is equal to 1, corresponds to 100 percents processor utilization.

In one example the execution order of the one or more tasks during the execution time frame allocated to the partition may be scheduled by a priority-based pre-emptive scheduler such as scheduled in order of decreasing process frequency i.e. the tasks in each partition are executed on a rate-monotonic (RM) priority basis.

In one example the execution order of one or more tasks during the execution time frame allocated to the partition may be scheduled on a deadline-monotonic (DM) basis i.e. tasks are scheduled in order of increasing deadline for task completion.

The priority-based pre-emptive scheduler may be arranged to interrupt task execution, when some higher-priority task needs to be executed and resume it at a later instant of time. In case of several tasks being assigned to the same partition are assigned with the same update frequency, first-in-first-out (FIFO) order may be used to determine internal order of execution. Hence, the execution of applications on each local node may be arranged to be controlled by a two level scheduler. The first level scheduler being arranged to schedule pre-emption of the partitions determined from the sequence of predetermined execution time frames for each of the partitions residing in the IMA partitioning module 15 of the respective local node 51-54. The second level scheduler being arranged to schedule the one or more tasks within each of the partitions on a priority pre-emptive basis during the predetermined execution time frame for the respective partition.

As an example with further reference the first partition 50 may be allocated to a first node S1 and assigned with the first execution time frame 121 of for example 10 ins and with a period of 25 ms corresponding to a repeat i.e. update frequency of 40 Hz. The first task 53, second task 55 and third task 56 may be associated to the first partition 50. The first and second task may be assigned with a task frequency of 40 Hz and the third task may be assigned with a task frequency of 20 Hz. The second partition 60 may be allocated to the node S1 and assigned with the second execution time frame 120 of for example 12 ms and with a period of 25 ins corresponding to a repeat i.e. update frequency of 40 Hz. The fourth task 62 and fifth task 63 associated to the second partition 60 may be assigned with a task frequency of 40 Hz and 20 Hz respectively. Hence, the instances i.e. particular execution during run-time of a series of subsequent executions of the first task 53 and the second task 55 are executed once each 25 ms time period, the instances of the third task 56 are executed once each 50 ms time period. The instances of the fourth task 62 are executed once each 25 ms time period and the instances of the fifth task 63 are executed once each 50 ms time period. The major time period 110 for the schedule may then be determined to be the least common multiple of all tasks associated to each of the nodes S1-S4, such as for example the least common multiple of 25 ms and 50 ms corresponding to 50 ms, which is the time period where after the sequence of execution of task instances i.e. schedule may repeat cyclically i.e. major execution cycle 110. It is to be noted that one or more task instances, such as the instance of the third task 56 and fifth task 63 may be pre-empted during a first execution of its associated partitions 50, 60 and later be resumed during a subsequent execution of its associated partition 50, 60. The third task 56 may for example be pre-empted depending on if the CT of the third task 56 together with the CT of one or more other tasks residing in the same partition such as for example the CT of the first task 53 and second task 55 exceeds the time period assigned to the respective partition 50.

In one example the task period of all the tasks within one or more of the partitions may be selected during system design so that the one or more partition is harmonic i.e. the period time of all tasks within each of the specific partitions are an integer multiple of the shortest task period allocated to any task within the specific partition.

In one example the task period of all the tasks within each partition may be selected during system design so that each of the partition are harmonic i.e. the period time of all tasks within the partition are an integer multiple of the shortest task period allocated to any task within partition.

In one example the task frequency may be selected from a set of frequencies such as the set of frequencies comprising 40 Hz, 20 Hz, 10 Hz and 1 Hz. The process frequency may be selected on basis of the process requirement for execution time.

In one example the set of task frequencies are provided as a set of system global frequencies. Hence, all tasks distributed across the entire distributed system of interconnected nodes may be assigned with a task frequency each, selected from the set of predetermined global task frequencies.

In one example the set of predetermined system global frequencies may be selected so that all frequencies within the provided set of predetermined system global frequencies forms a harmonic set i.e. the corresponding period time, being the inverse of each of the system global frequencies are integer multiples of the shortest period time.

In one example the task frequency of each specific task may be selected on basis of how often input data are updated or how often subsequent input data significantly changes in its parameter value.

In one example the task frequency of each specific task may be selected on basis of how often output data from the process is required by other parts of the system.

In one example the task frequency of each specific task may be selected on basis of a combination of how often input data are updated or how often subsequent input data significantly changes in its parameter value and/or how often output data from the process is required by other parts of the system.

In one example each of the system nodes S1-S4 may be arranged to implement a time triggered media access protocol such as a time-division-multiple-access (TDMA) based protocol, arranged to restrict the access to the network 2. Each system node S1-S4 may transmit data packets simultaneously onto the network in accordance with the time triggered media access protocol. Each member of the network 2 i.e. system nodes S1-S4 may be pre-assigned to predetermined points in time i.e. when it should transmit messages and further points in time when it can expect to receive messages. The predetermined points in time may be detected by software arranged in each of the system nodes S1-S4 such as by a driver associated to a programmable interrupt timer.

To be able to execute the time triggered schedule each of the system nodes may be arranged to maintain time by means of local hardware and/or software time keeping devices or a combination thereof. The time triggered media access protocol may be defined by a cyclic i.e. repeating communication schedule comprising a major communication cycle comprising a set of minor communication cycles each comprising a number of time-slots. At detection of the start of a time-slot, each system node may be arranged to transmit its allocated one or more data messages one after another.

As an example each time period, such as for example each 1 second time period may be configured to be divided into 20 equally sized 50 ms time-slots. Each of the 20 equally sized time-slots may be provided with information related to communication of data. The major communication cycle may comprise a number of minor cycles i.e. sets of said configured 50 ms time-slots. In case three minor cycles are differently configured regarding the information provided to the respective time-slots related to communication of data, then the corresponding major communication cycle is 3 seconds long. After the major communication cycle is completed it may be repeated indefinitely or until shutdown of system.

In one example each system node S1-S4 may be provided with a predetermined traffic schedule. The predetermined traffic schedule may be stored on a memory portion of a memory associated to each of the respective system nodes S1-S4. The fixed traffic schedule may comprise one or more tables of entries associating each of the time-slots with one or more corresponding data messages to transmit in at least one data packet. Each of the system nodes S1-S4 connected to the network 2 may by means of the fixed traffic schedule be statically allocated zero or more data packets to transmit in each time-slot of a series of subsequent time-slots in accordance with the time triggered media access protocol.

In one example the predetermined traffic schedule may be provided as part of the configuration data module 40.

In one example each of the system nodes S1-S4 connected to the network 2 may by means of the predetermined traffic schedule further be statically allocated zero or more data packets to receive from the network in each time-slot of a series of subsequent time-slots in accordance with the time triggered media access protocol.

The corresponding schedule may then be arranged to statically determine which specific node S1-S4 transmits and/or receives which specific data message at which point in time.

In one example the predetermined traffic schedule may be arranged to determine which specific node S1-S4 transmits and/or receives which specific data messages associated to which specific one or more partitions at which point in time.

In one example the predetermined traffic schedule may be arranged to determine which specific node S1-S4 transmits and/or receives which specific data messages associated to which specific one or more tasks of which specific partition at which point in time.

In one example the predetermined traffic schedule may be arranged to determine which specific node S1-S4 transmits and/or receives which specific data messages associated to which specific data variables associated to one or more tasks of which specific partition at which point in time.

In one example the data messages may be broadcast onto the network 2.

In one example the data messages may be multicast onto the network 2.

Figure 7:
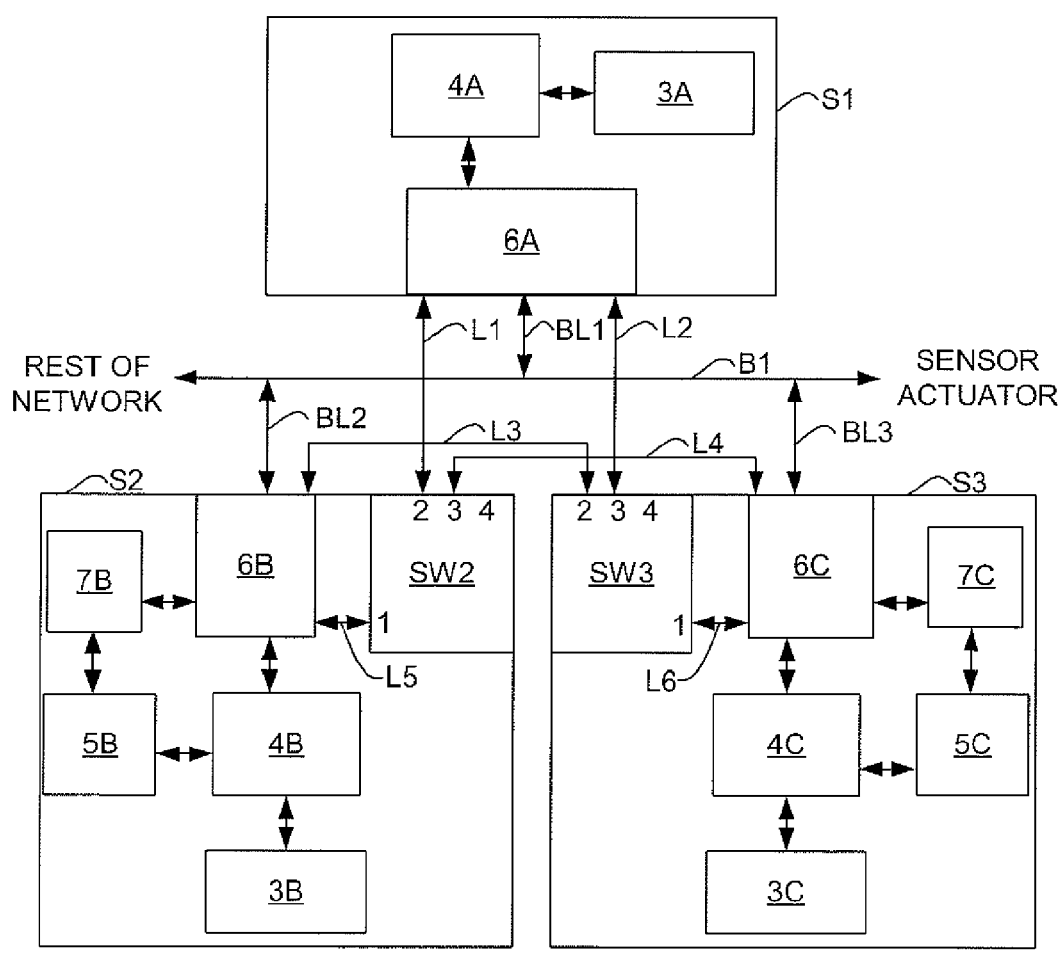
FIG. 7. shows a schematic block diagram of a communication network in accordance with an example of the invention.

With reference to the drawings and FIG. 7 there is illustrated a more detailed configuration of the network 2 arranged to interconnect the nodes according to an example of the invention. For purpose of illustration the configuration of the network 2 is depicted in a configuration comprising three nodes S1-S3. The distributed avionics computing system comprise in the shown example a first a second and a third system node S1-S3 arranged in communicative operation by means of a plurality of bidirectional Ethernet links L1-L6 in a dual redundant configuration comprising two switches SW2 and SW3 associated to the second and third system node respectively. Each of the two switches SW2 and SW3 comprises four ports 1-4. Each of the system nodes comprises a processor 4A-4C arranged to process one or more associated tasks in order to produce one or more data messages. Each of the processors 4A-4C is coupled to a memory 3A-3C comprising processing instructions for executing said associated tasks. The system nodes S1-S3 comprise a bus interface 6A-6C comprising an Ethernet socket and an Ethernet controller arranged to provide means for transmissions of data messages in one or more Ethernet data packets. The bus interface 6A-6C of each system node may further comprise additional sockets and controllers to allow to be coupled to at least a secondary bus B1 by means of bus links BL1-BL3. The secondary bus B1 may be a MIL-STD-1553 bus providing connections to other parts of the network such as additional system nodes, sensors and/or actuators. The second and third of the system nodes S2, S3 are provided with an I/O data processor (IOP) 7B, 7C. The IOP 7B, 7C of the at least one system node may be arranged to be in operative connection with a portion of a memory comprising information relating to the preconfigured traffic data schedule. The IOP 7B, 7C of the at least one system node is arranged to be in operative connection via the I/O interface 5A-5C with one or more portions of the memory 3B-3C associated to data messages provided from tasks. The IOP may implement memory access schemes such as for example direct memory access (DMA). The IOP 7B, 7C may be arranged to control all incoming and outgoing data transmissions from a system node S1-S3 based on the preconfigured traffic schedule. The IOP 7B, 7C may for example be arranged to implement timer services, such as for example periodic interrupts to trigger timed operations of the network interface 6A-6C in accordance with the preconfigured traffic schedule in providing units of data associated to one or more data messages from one or more portions of the associated memory 3B-3C to the network. The IOP 7B, 7C may further for example be arranged to implement timer services to trigger timed operations in accordance with the preconfigured traffic schedule in providing data received from the network to one or more portions of the associated memory 3B-3C. The timer services associated to several system nodes may be synchronized based on the synchronization data packets. The first system node S1 is arranged to perform control of its associated bus interface 6A such as for example by means of an input/output software module stored in the program memory 3A and scheduled to execute periodically on its associated processing node S1. The input/output software module is further arranged to operate in accordance with the preconfigured traffic schedule.

The port 4 of the switch SW2 and SW3 may be provided for connecting additional nodes to the network 2 such as for example connections from the node S4 to the network 2.

The bus interface of each system node S1-S3 may further be provided with one or more additional connections, such as connections to a secondary bus B1 by means of bus links BL1-BL3. The secondary bus B1 may be a MIL-STD-1553 bus providing connections to additional units other than node S1-S3 connected to the secondary bus B1.

In one example the communication network 2 may be an Ethernet network, such as for example a switched Ethernet network arranged in broadcast mode and the links L1-L4 may be standard Ethernet links, such as links conforming to the IEEE 803.2 specification.

It should be understood that the example with reference to FIG. 7 may be configured differently regarding the associated switches, memory configuration and processors. For example each processing node S1-S3 may comprise an associated IOP or alternatively several processing nodes S1-S3 may share access to a single IOP.

Figure 8:
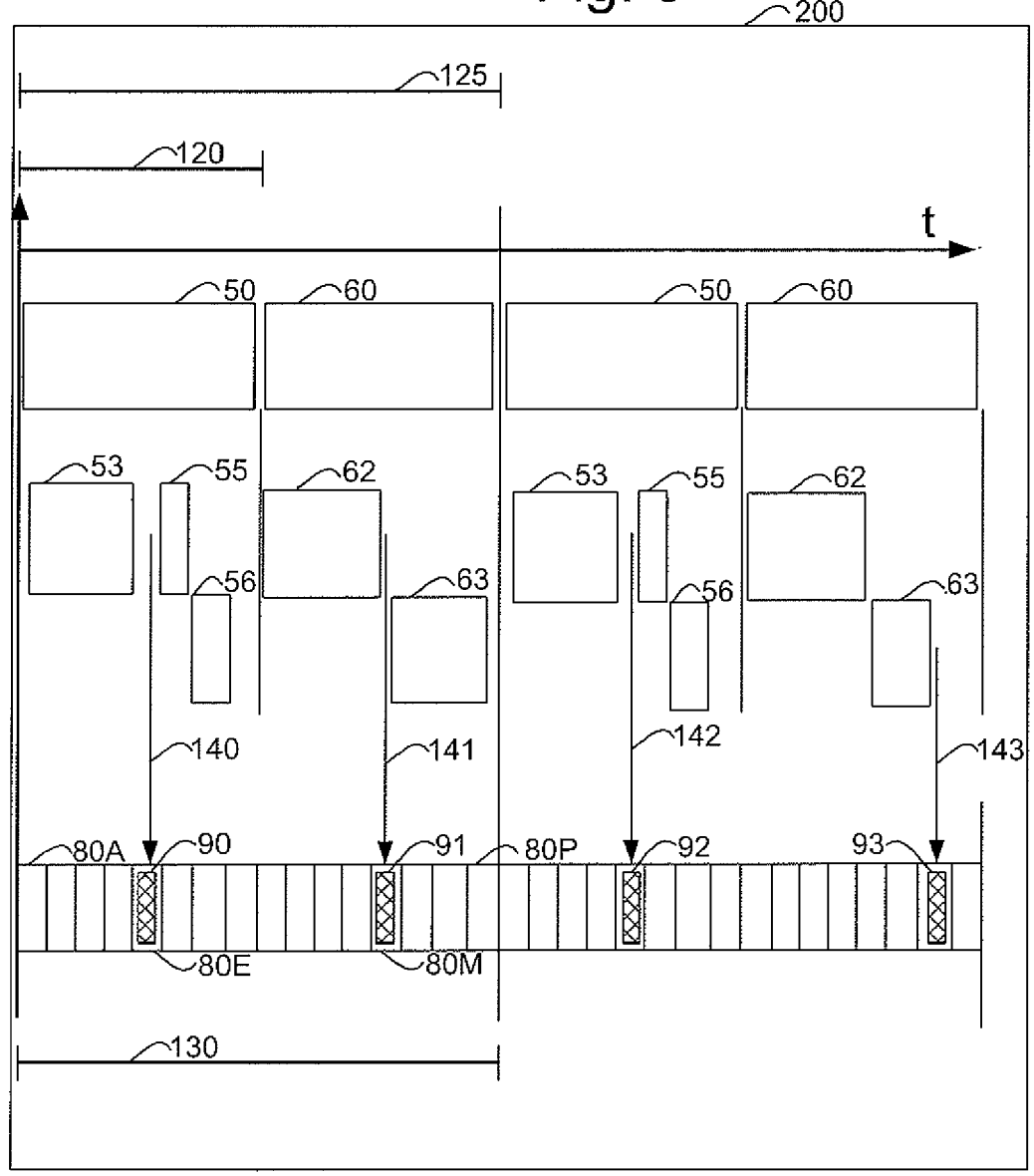
FIG. 8. shows a schematic illustration of a system schedule in accordance with an example of the invention.

In one example with reference to FIG. 8 an integrated execution and communication schedule 200 i.e. system schedule is illustrated. Each minor execution time frame 125 may be divided into a number of time-slots 80A-SOP defining a bus period 130, also referred to as the minor communication cycle. During the minor communication cycle 130, the first partition 50 and second partition 60 may be arranged to execute on the first node S1 according to their respective allocated processing time frames. The first task 53, fourth task 62 and fifth task 63 may be arranged to produce data, determined to be required by other parts coupled to the network 2, such as for example required tasks associated to the other nodes S2-S4. Transmission of data messages, comprising units of data from the tasks, such as comprising data from the first task 53 and fourth task 62 may be initiated by means of a time trigger mechanism, operating in accordance with the communication schedule 200. At the beginning of the time-slot 80E a first transmission 140 of a first data packet 90 comprising units of data provided from the first task 53 is initiated. At the beginning of the time-slot 80M a second transmission 141 of a second data packet 91 provided from the fourth task 62 is initiated. The transmission process may then be repeated in subsequent bus periods, such as repeated with a third transmission 142 of a third data packet 92 associated to the first task 53 and fourth 143 transmission of a fourth data packet 93 associated to the fifth task 63. In one example the transmission process may comprise instructing software to transform data to be transmitted into a data message format suitable for transmission on the network 2, such as transform data into an Ethernet packet also referred to as Ethernet frame by means of an Ethernet driver.

It is to be noted that apart from the procedure illustrated with reference to FIG. 8 regarding arranging messages to transmit into time-slots, also the reversed procedure regarding receiving and/or retrieving messages from the network may as well be arranged into time-slots.

In one example a number of bus periods, such as the bus period 130, each comprising an equal number of time-slots, may together form the major communication cycle, whereof each time-slot in each bus period may be arranged to trigger one or more combinations of transmissions onto the network 2.

In one example the length of the bus period 130 may be arranged to correspond to the length of the minor execution time frame, determined from the shortest period time formed by the inverse of the highest task frequency of the set of system global task frequencies.

In one example the one or more minor execution frames 125 may each be arranged to be divided into a number of time-slots, ranging from 4 to 128 time-slots, such as for example each be divided into 32 time-slots.

In one example a condition for the fixed traffic schedule may be determined to avoid time-slot overrun i.e. a situation where a node starts to transmit while data messages from a preceding time slot are still present on the network 2. The condition may in one example be implemented by means of arranging the length of each of the time-slots i.e. time-interval between two consecutive time-slots to be substantially larger than the time it takes to transmit each message on the network 2 including the maximum amount of delay caused by the network in transmitting each of the messages including the procedures of handling I/O at the nodes S1-S4. By the use of the condition arranged to avoid time-slot overrun, the design of the distributed avionics system is able to bound worst case transmission delay.

By considering the communication requirements of the each of the respective system nodes and the physical properties of the communication network 2 the time triggered traffic schedule may be determined off-line.

The specific time triggered predetermined traffic schedule may be determined by hand or by means of scheduling software executed on a computer. After the time triggered traffic schedule is determined it may subsequently be transformed into instruction readable by a computer such as compiled into binary format.

In the case where one or more tasks are categorized as interdependent tasks i.e. tasks being dependent on other tasks such as dependent on a precedent relation, communication of the result of the one or more processed task i.e. task output values and task execution need to be coordinated. Communication may be provided both between different tasks within one and the same partition referred to as intra partition communication and between partitions allocated to one and same node and/or between partitions allocated to different nodes S1-S4 referred to as inter partition communication. To allow for communication of data between the different partitions each partition may be provided with one or more sampling and/or queuing ports accessible to the tasks associated to the partition. The sampling and/or queuing ports i.e. logical ports may be constructed during system design of the software in accordance with ARINC 653 specifications. The sampling and/or queuing ports may each be provided with a unique memory portion, such as a unique memory portion of the memory 3 of the respective node S1-S4. Each port may be provided with a unique port address in order for the nodes of the distributed avionics computing system to be able to identify the correct port to retrieve or place units of data to.

The sampling and/or queuing ports may in one example be associated with User Datagram Protocol (UDP) port numbers to identify each data message and where to place the units of data provided in each of said data message. Hence, the IOP and/or partition arranged to control I/O traffic of a system node S1-S4 may use the UDP port numbers to identify the correct place i.e. memory address to perform read and/or write operations regarding data messages and associated one or more units of data stored in one or more memory components associated to the system nodes S1-S4.

Worst case transmission time WCT need to be considered when determining the fixed traffic schedule. The WCT may be referred to as the time from when a particular unit of data is produced by completion of an instance from a first task and is ready for transport until the time when the particular unit of data has been transported and is ready for processing by an instance of a second task. The actual transmission time may vary from time to time based on variation in the arrival or departure times referred to as jitter caused by switches, input/output processing and configuration of physical transmission medium etc. Parameters that may affect the WCT may for example include type and length of cabling along the respective intended data packet routing and the policy and performance of the switch regarding memory access, the amount of data traffic and processing power. The WCT may be determined according to the following equation.

$$WCT = S_P + P_{R1} + S_w + P_{R2} + R_P$$

Wherein $S_P$ denotes time it takes for the respective system node S1-S4 to process operations related to transmission of data messages, wherein $P_{R1}$ and $P_{R2}$ denotes propagation delay inflicted by transmitting electrical signals corresponding to data packets along cables to and from the switch. $S_w$ denotes delay inflicted by queuing and routing the data packets in the switch. $R_P$ is the time it takes for the respective system node S1-S4 to process operations related to receiving data packets and retrieving data messages from said data packets.

Figure 9:
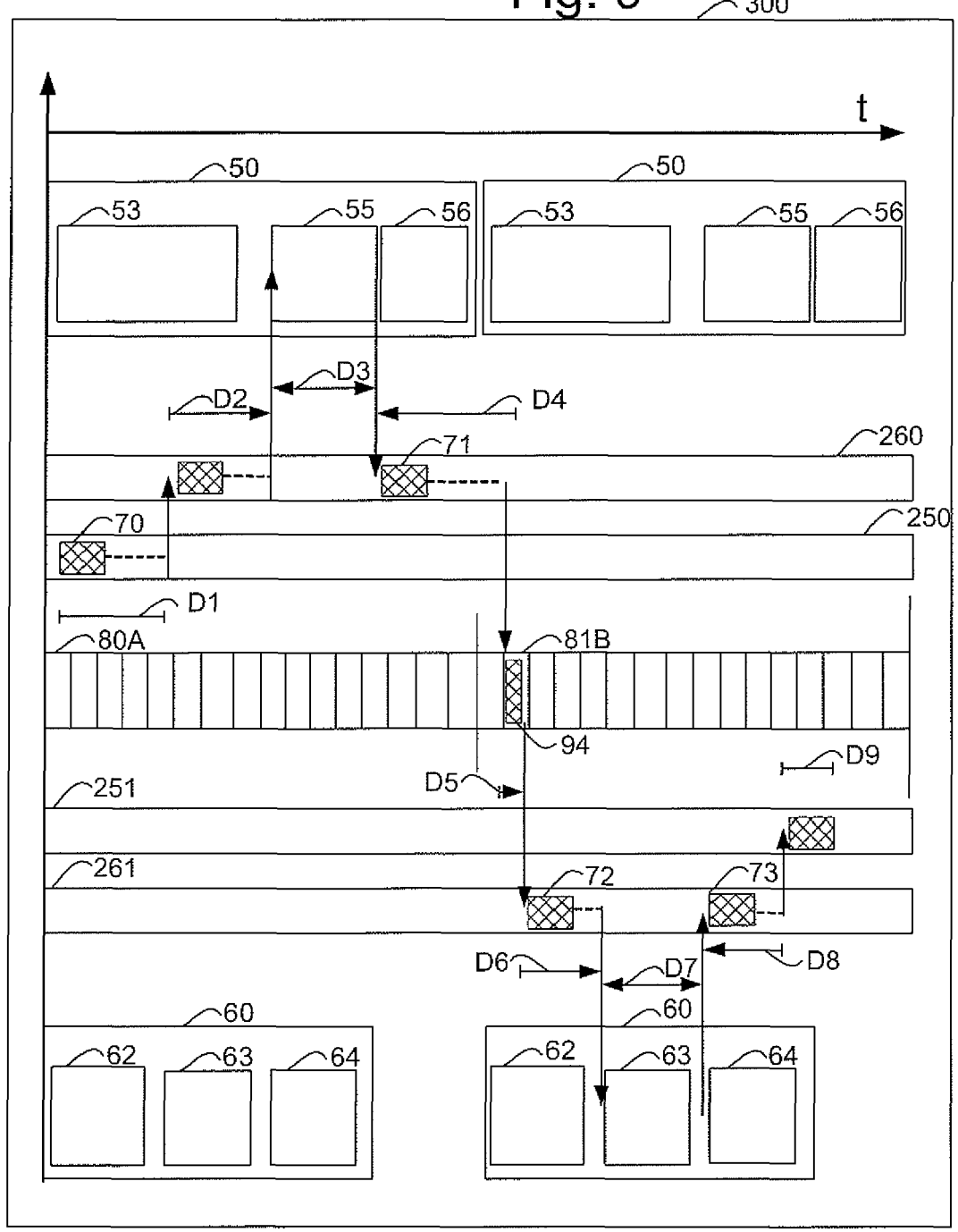
FIG. 9. shows a schematic illustration of a system schedule in accordance with another example of the invention.

In FIG. 9 a schematic integrated execution and communication schedule 300 is illustrated in accordance with an example of the invention. The first node S1 may be arranged to execute the first periodic task 53 the second task 55 and the third task 56 allocated to the first partition 50. The second node S2 may be arranged to execute the fourth periodic task 62, the fifth periodic task 63 and a sixth periodic task 64 allocated to the second partition 60. For purpose of illustration, only the second task 55 and the fifth task 63 are involved in inter partition communication involving transmitting data packets over the network 2. The fifth task 63 may be dependent on output data provided by the second task 55. The second task 55 may be arranged to produce data corresponding to positional data on a 40 Hz basis from using information provided by an inertial measurement unit (IMU). The information i.e. IMU data 70 may be received via a bus B1 connecting the bus interface 6A of the first node S1 to the IMU. For transport of the information provided from the IMU on the bus B1 a first transaction time D1 of a first timeline 250 associated to the bus B1 is required. A first I/O task and/or operation of a first IOP 7A associated to the first node S1 may be arranged to transfer the data from the IMU received via the bus interface 6A to an input port of the first partition 50 such as for example a sampling port associated to the first partition 50. For the first IOP 7A associated to the first node S1 to perform the task or operation related to data transfer a second transaction time D2 of a second timeline 260 associated to the first IOP 7A is required. For processing of the IMU data by means of the second task 55 in order to provide positional data a third transaction time D3 is required, being associated to the WCET of the second task. A second I/O task of the IOP 7A associated to the first node represented by the second timeline 260 may be arranged to retrieve, encapsulate and transfer the positional data 72 from the second task 55 via the bus interface 6A onto the network 2 in a predetermined time-slot 81B requiring a fourth transaction time D4. Transporting the positional data 72 encapsulated into a data packet 94 on network 2 via one or more switches to a second bus interface 6B associated to the second node S2 require a fifth transaction time D5. A third I/O task of a second IOP 7B associated to the second node S2 represented by a second timeline 261 may be arranged to retrieve data packets received from the network such as the data packet 94 and place the de-capsulated data on an input port of the second partition 60 such as a sampling port associated to the second partition 60, which require a sixth transaction time D6. The fifth task 63 may be arranged to produce an output corresponding to a "position report message" on a 40 Hz basis, based on the positional data received from the second task 55, which require a seventh transaction time D7, being associated to the WCET of the fifth task. A fourth I/O task and/or operation of the second IOP 7B represented by a second timeline 261 may be arranged to periodically retrieve, format and transfer processed data corresponding to positional report data 73 from the task 63 via the bus interface 68 to the bus B1 to a second designated receiver such as for example an ADS-B transponder coupled to the bus B1, requiring an eight transaction time D8. The positional report data 73 from the task 63 may be received by the ADS-B transponder via the bus B1 after a ninth transaction time D9 of a first timeline 251 representing time spent on transport on the bus B1. Hence, the total time represented by the sum of the series of transaction times D1-D8 form an end-to-end transaction time also referred to as end-to-end communication delay. In order to guarantee timely arrival of data delay constraints may be applied to the end-to-end transaction time and/or to relative time represented by one or more individual transaction times when constructing the integrated execution and communication schedule 300.

It should be understood that the communication system with reference to the above example including the tasks 53, 55, 56, 62, 63 and 64 each described with a specific timing requirements may be configured differently. Differences may include the number of tasks, each of the tasks may transmit more than one data message and the tasks may be dependent on more than one different task or other system connected to the network 2.

In one example the first time-slot 80A of each minor cycle 130 may be assigned to a synchronization data message. The last time-slot 80P in each of the minor cycles 130 may be configured to be a "dead band" also referred to as a refusal window in order to provide separation between subsequent minor cycles.

In one example a common time reference also referred to as local avionics system time (AST) is provided. To be able to effectively implement time triggered execution and communication across the entire distributed avionics system, it is important that all nodes S1-S4 have one and the same view of time. To maintain substantially the same view of system time among the system nodes, a synchronization protocol may be implemented in the system to synchronize the local time keeping devices such as the hardware clocks of each node S1-S4 to the system global time AST.

In one example synchronization data messages indicating the start of the bus period may be sent on a cyclic basis from a master node, such as from a flight control computer (FCC) responsible for flight safety critical operations. The synchronization data messages may be received by the system nodes whereby each receiving node can use the synchronization message to detect if it is synchronized and respond accordingly such as initiate processing according to its predetermined execution and communication schedule or by re-synchronizing its respective local clock based on time content provided in the synchronization message.

The master node may in one example be provided with a high quality time keeping device such as a high quality crystal oscillator, or be synchronized to external high quality time keeping devices such as by means of receiving PPS pulses from atomic clocks featured in Global Positioning Systems (GPS). The latter may be beneficial in case the system involves nodes and/or LRU:s that perform calculations involving positioning or other calculations that are performed on basis of an external global time value, such as GMT.

In one example the system nodes S1-S4 may be synchronized in time using the IEEE 1588, standard for a precision clock synchronization protocol for networked measurement and control systems.

In one example system start-up may implement an initialization phase until all modules are synchronous. The initialization phase may be initiated by a power up of the distributed avionics system.

In one example the system nodes S1-S4 may be arranged to operate on basis of a fail silent protocol. The fail silent protocol is based on that only system nodes that are substantially synchronized in time i.e. within a tolerance level in respect of the AST may be arranged to transmit data messages. As soon as each of the system nodes is able to resynchronize, the respective system nodes may be allowed to transmit its data messages according to the schedule. This means that effects of local clock jitter, drift or effects resulting from a system startup procedure of each system node may not affect transmitting messages being out of sync with respect to the predefined schedule.

In one example the fail silent protocol may further be arranged to control the execution schedule of the tasks associated to each of the nodes. As an example the fail silent protocol may suspend execution of tasks until the respective node in which the tasks reside, is appropriately synchronized.

In one example the tasks belonging to partitions that are allocated to one node that is determined to be synchronized may be arranged to implement predetermined default values as source values, i.e. input values in the case where the respective tasks to be executed are dependent from output values not yet computed or dependent from output values computed by tasks belonging to partitions allocated to one node that is determined not to be synchronized such as during the initialization phase.

In one example the synchronization protocol may be arranged to synchronize all nodes S1-S4 to for example within a tolerance level of 1 to 20 microseconds, such as for example 3 microseconds.

In one example information to be provided to the configuration data module 40 associated to each of the nodes S1-S4 may be constructed and/or managed using a set of configuration files. The set of configuration files may provide various elements of the distributed avionics computer system with configuration information relating to scheduling, memory access and communication. The set of configuration files may for example provide the information to the operating system OS and/or hardware interfaces and/or other components of the respective system nodes S1-S4. Construction of the set of configuration files may be performed in several ways using different forms. The configuration files may for example be in the form of some programming language data declarations, in general markup language form such as for example in eXtensible Markup Language (XML), or in some text-based proprietary format.

In one example the set of configuration files may be constructed using model based development tools.

In one example a first subset of the set of configuration files may be automatically generated based on a second subset of the set of configuration files.

The configuration data from the configuration files associated to partitioning of the set of applications and other OS related attributes can later be linked to and compiled with source code associated to for example the set of applications to provide executable files in machine readable format.

In one example the configuration files may be compiled into binary format using a RTCA DO-178B certified compiler.

In one example a subset of the set of configuration files may be associated to an ARINC 653 implementation associated to each of the nodes S1-S4. The subset of configuration files, may describe the characteristics of partitions, their interactions, and their time and resource requirements. After the subset of configuration files is loaded and processed, the ARINC 653 based RTOS associated to each of the nodes S1-S4 may provide the behavioral ARINC 653 support by allocating memory for the system partitions, setting up memory protection structures, and allocating other system resources.

In one example of the present invention additional configuration data may be constructed from a set configuration files comprising a number of subsets of configuration files. Each of the subset of configuration files may comprise one or more configuration file associated to one of a group comprising system hardware topology, software topology, data messages, system timing, and applications.

In one example each of the configuration files from the subset of configuration files may be used as input data to a set of operational tools. The set of operational tools may be arranged to process information extracted from one or more of each of the configuration files so as to automatically provide the additional configuration data related to for example connectivity between the set of applications.

In one example the set of operational tools may be arranged to provide machine readable configuration data associated to connectivity. The machine readable configuration data associated to connectivity may comprise instructions relating to I/O traffic for control of various I/O mechanisms arranged to operate within the distributed avionics computer system such as for example at least an I/O partition or IOP 7C, 7C associated one or more of each of the nodes S1-S4.

As a result of the operations of the set of operational tools the preconfigured traffic schedule may be generated automatically off-line for each of the nodes S1-S4 as a static description of the network transactions within a major bus period that is periodically repeated. The preconfigured traffic schedule is statically determined i.e. it is predetermined from the allocation of each of the one or more data messages into the plurality of communication time-slots 80A-80P when each of the one or more data messages is sent onto the network 2. It is further predetermined which of the one or more data messages that comprise which one or more data variable. The preconfigured traffic schedule can be generated for a predetermined distributed avionics computer system based on configuration files comprising configuration data associated to configuration of hardware and software.

The operational tools may in one example be implemented as software operating in a computer environment separated from the distributed avionics computer system.

In one example one or more of the nodes S1-S4 may comprise a built in test partition arranged to provide means for monitoring and maintenance of the respective node and or distributed avionics system.

In one example one or more of the nodes S1-S4 may comprise a fault condition detection partition arranged to detect malfunctions in the distributed avionics system. Upon detection of a fault condition in a specific partition, the fault condition detection partition may be arranged to switch execution from the partition wherein the fault condition is detected to a redundant partition comprising backup application performing the substantially same functions as the original application contained in the faulty partition.

In one example the fault condition detection partition may be arranged to detect malfunctions in the distributed avionics system related to one or more fault condition in hardware. Upon detection of the one or more hardware related fault condition the fault condition detection partition may be arranged to perform one or more mode-switches, related to selecting during system run-time an alternate reduced task update frequency for a number of task with resulting lowered system utilization. The use of the mode-switch provides the distributed avionics system with the ability to control the utilization of system resources, such as processing and memory resources in case of a previously detected reduction of available system resources due to one or more hardware fault conditions.

In one example with further reference to FIG. 7 the communication system is based on two parallel identical networks including the two switches SW2, SW3 and the Ethernet links, providing two independent communication channels between each of the system nodes. Each data packet transmitted from a sending node may be transmitted substantially in parallel on both channels. As an example the first system node S1 may be arranged to transmit its data packets to both channels. The bus interface 6C of the third node then receives the data packets both via a first communication channel 6A-L1-SW2-L4 and via a second communication channel 6A-L2-SW3-L6. This means that each receiving node receives two copies of each transmitted data packet. The receiving node may be provided with a filtering device arranged to filter out copies of the received data packets.

In one example the sending node may be arranged to provide a sequence marking on the data message before transmitting the data packet on the network. By providing each subsequent transmitted data packet with an incrementing sequence number the filtering device may be arranged to filter out copies by detecting non-incrementing sequence number of the received data packets. To reduce the number of bits in a packet necessary for the sequence number the incrementing sequence number can be subjected to a roll over at a predetermined sequence number.

In one example the filtering device may be arranged to filter out copies of the data packets on basis of detecting time of arrival. The filter may then be arranged to filter out the copy by discarding the redundant data packets as indicated by the arrival time.

All data packets may be provided with a checksum at the sending node S1-S4 such as cyclic redundancy check (CRC) and/or other error correcting code (ECC). The checksum can be verified at a receiving node to control integrity of the received data.

In one example the system nodes S1-S4 may each comprise a non-volatile memory, a data processing device such as a microprocessor and a read/write memory. The non-volatile memory has a first memory portion wherein a computer program, such as an operating system, is stored for controlling the function of the distributed avionics computing system. Further, the system nodes S1-S4 comprises a bus controller, a serial communication port, I/O-means, an A/D-converter, a time date entry and transmission unit, an event counter and an interrupt controller. The non-volatile memory also has a second memory portion.

A computer program comprising routines for controlling the function of the distributed avionics computing system is provided. The program may be stored in an executable manner or in a compressed state in a separate memory and/or in the read/write memory.

When it is stated that the data processing device performs a certain function it should be understood that the data processing device performs a certain part of the program which is stored in separate memory, or a certain part of the program which is stored in read/write memory.

The data processing device may communicate with a data port by means of a first data bus. The non-volatile memory is adapted for communication with the data processing device via a second data bus. The separate memory is adapted to communicate with data processing device via a third data bus. The read/write memory is adapted to communicate with the data processing device via a fourth data bus.

When data is received on the data port it is temporarily stored in the second memory portion. When the received input data has been temporarily stored, the data processing device is set up to perform execution of code in a manner described above. According to one example, data received on the data port comprises information regarding the source values from sensors or pre-processed source values from other nodes scheduled for processing and avionics system time AST providing the correct points in time referring to when to retrieve source values, when to process source values and when to place output values as determined from the preconfigured static system schedule comprising the integrated bus i.e. communication schedule and execution schedule. This information can be used by the nodes S1-S4 so as to operate the distributed avionics computing system to control at least one avionics function, as described above.

An example of the invention relates to a computer programme comprising a programme code for performing the method steps depicted with reference to FIG. 10, when the computer programme is run on a computer.

An example of the invention relates to a computer programme product comprising a program code stored on computer-readable media for performing the method steps depicted with reference to FIG. 10, when the computer programme is run on the computer.

An example of the invention relates to a computer programme product directly storable in an internal memory of a computer, comprising a computer programme for performing the method steps depicted with reference to FIG. 10, when the computer programme is run on the computer.

FIG. 10 schematically illustrates a flow diagram of a method according to an example of the present invention. This example relates to operating the distributed avionics computing system to control at least one avionics function.

In a first method step S500 input values are provided, i.e. each system node is provided with units of data needed for processing tasks in order to provide one or more units of data associated to controlling the at least one avionics function. The input values may for example correspond to periodically acquired sensor values and/or units of data provided by one or more previously processed task. After the method step s500 a subsequent method step s510 is performed In the method step S510 synchronization of the system nodes is performed. This means that a synchronization message is transmitted onto the network arranged to provide synchronization information to the system nodes. After the method step S510 a subsequent method step S520 is performed.

In the method step S520 a repeating set of processing frames are generated. This means that a time interval is repeatedly detected to form fixed points in time defining processing time frames 125 based on a first predetermined interval in accordance with a least common multiple (LCM) of a set of global task periods and the at least one cycle start signal. After the method step S520 a subsequent method step S530 is performed.

In the method step S530 at least one task set i.e. partition is selected to be processed. The at least one partition to be processed is selected based a predetermined schedule determining the sequence in which to process the partition within each processing time frame and the time portion of the processing frame in which to process the partition. After the method step S530 a subsequent method step S540 is performed.

In the method step S540 the order in which to process tasks associated to selected partitions are selected. The order in which to process tasks associated to selected partitions are selected based on a predetermined processing rate i.e. frequency associated to each of the tasks. Each of the tasks within each selected partition is then processed in descending priority order of said associated processing rate. The predetermined processing rates are selected from the set of global processing rates. After the method step S540 the method ends in one example and may be repeated starting with the method step S500 to perform a new controlled data processing session.

In another example the method step S530 is followed by that a subsequent method step S550 is performed. In the method step S550 a set of periodic communication time frames are generated within each generated processing time frame. This means that each processing time frame of the repeating set of processing time frames is divided into a number of communication time frames i.e. time-slots. The time-slots may be detected based on a second predetermined periodic time interval associated to the duration of time-slots in accordance with the predetermined traffic schedule. After the method step S550 a subsequent method step S560 may be performed.

In the method step S560 data packet are transmitted onto the network in accordance with the preconfigured traffic schedule. This means that the packets are transmitted in accordance with a predetermined timing table i.e. preconfigured traffic schedule statically allocating to each of the plurality of time-slots a predetermined number of data packets, each comprising a predetermined subset of data messages from said set of data. After the method step S560 the method ends and may be repeated starting with the method step S500 to perform a new controlled data processing and transmission session.

In one example in the method step S560 data packets may be transmitted along two independent paths formed in the network 2, such as for example from a first node S1 via a first communication channel 6A-L1-SW2-L4 and via a second communication channel 6A-L2-SW3-L6.

In one example the method step S530 further comprises to select within each of the generated processing time frames at least one task set to process for a predetermined time frame each within each processing time frames and in a predetermined memory address space each. This means that the predetermined process schedule operates conformant with ARINC 653 specifications.

Many modifications and variations will be apparent to practitioners skilled in the art without departing from the scope of the invention as defined in the appended claims. The examples were chosen and described in order to best explain the principles of the invention and its practical applications, thereby enabling others skilled in the art to understand the invention for various examples and with various modifications as suited to the particular use contemplated.

The invention claimed is:

1. A distributed avionics system arranged in an aerial vehicle for controlling at least one avionics function, the system comprising:
    a plurality of avionics processing subsystems interconnected in a network, each avionics processing subsystems comprising:
    a processor arranged to process at least one task so as to provide a set of data messages comprising one or more units of data related to controlling the at least one avionics function on basis of provided input data, related to conditions of the at least one avionics function,
    a memory module in operative connection with the processor and arranged to store instructions for the processor to process said at least one task,
    wherein at least one of the avionics processing subsystems is arranged to transmit at least one synchronization cycle start signal onto the network,
    each avionics processing subsystem is arranged to generate a repeating set of periodic processing time frames by detecting repeatedly subsequent instants of time, based on a first predetermined interval and the at least one cycle start signal,
    each avionics processing subsystem is arranged to select within each of the generated processing time frames at least one task set to process, based on a predetermined schedule,
    each avionics processing subsystem is arranged to select the order in which to process each of at least one task within each of the selected at least one task set, based on a predetermined processing rate associated to each of the at least one task, determined from a set of system global processing rates in descending order of said associated processing rate,
    wherein each of the processing subsystems is arranged to generate a plurality of periodic communication time frames by detecting repeatedly subsequent instants of time within each generated processing time frame, based on a second predetermined periodic time interval, and wherein each of the processing subsystems comprise a network interface and transmission control unit arranged to control the network interface to perform scheduled transmissions of data packets, wherein said transmission control unit is provided with access to memory means comprising scheduling information relating to a timing table statically allocating to said plurality of communication time frames a predetermined number of data packets, each comprising a predetermined subset of data messages from said set of data messages.

2. The distributed avionics system according to claim 1, wherein at least one of the tasks within at least one task set, allocated to at least one of the avionics processing subsystems of the plurality of avionics processing subsystems is arranged to be dependent on at least one of one or more units of data provided by at least one previously processed task allocated to a different avionics processing subsystems of the plurality of avionics processing subsystems in order to provide one or more units of data related to controlling the at least one avionics function.

3. The distributed avionics system according to claim 1, wherein the scheduling information is based on determined end-to-end communication delay constraints associated to communication of the data messages between processes allocated to different system nodes.

4. The distributed avionics system according to claim i, the scheduling information is configured so as to prevent communication time frame over-run wherein at least one of the data packets is transported on the network for a plurality of consecutive communication time frames.

5. The distributed avionics system according to claim 1, wherein each of the avionics processing subsystems is arranged to select within each of the generated processing time frames at least one task set to process, based on a predetermined sequence of task sets, further comprises to select within each of the generated processing time frames at least one task set to process for a predetermined time frame each in a predetermined memory address space each.

6. A method of operating a distributed avionics system for controlling at least one avionics function, the method comprising: providing input data, related to conditions of the at least one avionics function, providing the input data to the memory unit of the processing subsystems for later processing by at least one task in order to provide a set data message comprising one or more units of data related to controlling the at least one avionics function,
    synchronize the avionics processing subsystems in time by generating at least one cycle start signal onto the network,
    wherein the method further comprises in each of the processing subsystems:
    generating a repeating set of periodic processing time frames by detecting repeatedly subsequent instants of time, based on a first predetermined interval and the at least one cycle start signal,
    selecting within each of the generated processing time frames at least one task set to process, based on a predetermined schedule,
    selecting the order in which to process each of at least one task within each of the selected at least one task set, based on a predetermined processing rate associated to each of the at least one task, determined from a set of system global processing rates in descending order of said associated processing rate,
    wherein the method further comprises in each of the processing subsystems:
    generating a set of periodic communication time frames by detecting repeatedly subsequent instants of time within each generated processing time frame, based on a second predetermined periodic time interval,
    perform scheduled transmissions of data packets, based on scheduling information relating to a timing table statically allocating to each of the plurality of said periodic communication time frames a predetermined number of data packets, each comprising a predetermined subset of data messages from said set of data messages.

7. The method according to claim 6, further comprising:
    transmitting the data packets along two independent paths formed in the network, based on a plurality of traffic control modules.

8. The method according to claim 6, wherein each of the processing subsystems is configured to:
  select within each of the generated processing time frames at least one task set to process, based on a predetermined sequence of task sets, and
  select within each of the generated processing time frames at least one task set to process for a predetermined time frame each in a predetermined memory address space each.

9. A computer programme product, comprising:
  a non-transitory computer readable medium; and
  a programme code recorded on the computer readable medium for performing when said computer programme is run on a computer a method for operating a distributed avionics system for controlling at least one avionics function, the method comprising
  providing input data, related to conditions of the at least one avionics function,
  providing the input data to the memory unit of the processing subsystems for later processing by at least one task in order to provide a set data message comprising one or more units of data related to controlling the at least one avionics function,
  synchronize the avionics processing subsystems in time by generating at least one cycle start signal onto the network,
  wherein the method further comprises in each of the processing subsystems
  generating a repeating set of periodic processing time frames by detecting repeatedly subsequent instants of time, based on a first predetermined interval and the at least one cycle start signal,
  selecting within each of the generated processing time frames at least one task set to process, based on a predetermined schedule,
  selecting the order in which to process each of at least one task within each of the selected at least one task set, based on a predetermined processing rate associated to each of the at least one task, determined from a set of system global processing rates in descending order of said associated processing rate,
  wherein the method further comprises in each of the processing subsystems
  generating a set of periodic communication time frames by detecting repeatedly subsequent instants of time within each generated processing time frame, based on a second predetermined periodic time interval,
  perform scheduled transmissions of data packets, based on scheduling information relating to a timing table statically allocating to each of the plurality of said periodic communication time frames a predetermined number of data packets, each comprising a predetermined subset of data messages from said set of data messages.

* * * * *